United States Patent
Barberis et al.

(10) Patent No.: US 8,137,488 B2
(45) Date of Patent: Mar. 20, 2012

(54) METHOD OF PRODUCING A FLAT ZIRCONIUM ALLOY PRODUCT, FLAT PRODUCT THUS OBTAINED AND A NUCLEAR PLANT REACTOR GRID WHICH IS MADE FROM SAID FLAT PRODUCT

(75) Inventors: Pierre Barberis, Ugine (FR); Claude Simonot, L'Aigle (FR)

(73) Assignee: Compagnie Europeenne du Zirconium CEZUS, Paris (FR)

(*) Notice: Subject to any disclaimer, the term of this patent is extended or adjusted under 35 U.S.C. 154(b) by 293 days.

(21) Appl. No.: 10/575,020

(22) PCT Filed: Sep. 29, 2004

(86) PCT No.: PCT/FR2004/002467
§ 371 (c)(1),
(2), (4) Date: Apr. 7, 2006

(87) PCT Pub. No.: WO2005/035817
PCT Pub. Date: Apr. 21, 2005

(65) Prior Publication Data
US 2007/0053476 A1    Mar. 8, 2007

(30) Foreign Application Priority Data
Oct. 8, 2003   (FR) .................................. 03 11767

(51) Int. Cl.
*C22F 1/18*      (2006.01)
(52) U.S. Cl. ................. 148/672; 148/421; 376/342
(58) Field of Classification Search ............ 148/672, 148/421; 376/342
See application file for complete search history.

(56) References Cited

U.S. PATENT DOCUMENTS

| | | | |
|---|---|---|---|
| 4,212,686 | A | 7/1980 | Asher et al. |
| 4,992,240 | A | 2/1991 | Komatsu et al. |
| 5,256,216 | A | 10/1993 | Chauvel-Trepier |
| 5,487,797 | A | 1/1996 | Dumas et al. |
| 5,560,790 | A | 10/1996 | Nikulina et al. |
| 5,985,211 | A | 11/1999 | Kim et al. |

FOREIGN PATENT DOCUMENTS

| | | |
|---|---|---|
| EP | 0 220 060 | 4/1987 |
| EP | 0 559 096 | 9/1993 |
| EP | 0 802 264 | 10/1997 |
| WO | WO 00/48199 | 8/2000 |
| WO | WO 01/24193 | 4/2001 |
| WO | WO 01/61062 | 8/2001 |

*Primary Examiner* — Emily M. Le
*Assistant Examiner* — Weiping Zhu
(74) *Attorney, Agent, or Firm* — Davidson, Davidson & Kappel, LLC

(57) ABSTRACT

The invention relates to a method of producing a flat zirconium alloy product with a Kearns factor (cross direction) of between 0.3 and 0.7. The inventive method consists in: producing an ingot containing Nb=0.5 to 3.5%, Sn=0 to 1.5%, Fe=0 to 0.5%, Cr+V=0 to 0.3%, S=0 to 100 ppm, O=0 to 2000 ppm, Si=0 to 150 ppm, the remainder being zirconium and impurities; shaping the aforementioned ingot; performing one or more hot rolling operations in order to obtain a flat product, whereby the last operation is performed at between $(810-20\times Nb\%)°$ C. and $1100°$ C. and is not followed by any quenching from phase $\alpha+\beta$ or $\beta$; optionally performing an annealing operation at a maximum of 800° C.; and performing one or more cold rolling and annealing operations, said annealing operations being performed at a maximum of 800° C. The invention also relates to the flat zirconium alloy product thus obtained. The invention further relates to a support grid for fuel rods in a nuclear plant reactor, which is obtained by shaping the flat product.

4 Claims, 1 Drawing Sheet

Figure de pôle calculée
002

Figure de pôle calculée
100

METHOD OF PRODUCING A FLAT ZIRCONIUM ALLOY PRODUCT, FLAT PRODUCT THUS OBTAINED AND A NUCLEAR PLANT REACTOR GRID WHICH IS MADE FROM SAID FLAT PRODUCT

FIELD OF THE INVENTION

The invention relates to the field of flat products (plate and sheet) made of a zirconium alloy, these being used in particular for manufacturing components of a light-water nuclear power plant reactor.

BACKGROUND INFORMATION

In light-water nuclear reactors, the spacer grids made of zirconium alloy that retain the rods (fuel-containing tubes) form cells into which the rods are inserted and retained by assemblies of rigid means and resilient means.

These spacer grids are subjected to irradiation-induced growth, under the effect of which the dimensions of the cells are modified over the course of operation of the reactor. This modification makes the retention of the rods looser and looser, and the grids end up by no longer fulfilling their role satisfactorily.

It has been proposed in document EP-A-0 220 060 to produce these grids from a flat product made of a fully recrystallized zirconium alloy possessing a particular texture. This texture is such that the Kearns factors measured along the transverse direction and the longitudinal direction of the cell, when the grid is in place, are combined so that the irradiation of the grid during operation of the reactor causes a contraction of the cell and not an increase in its cross section. Thus, the clamping force exerted by the grid on the rods tends to increase instead of decrease.

It should be noted that document EP-A-0 220 060 does not propose a process for actually obtaining the desired texture. Processes for obtaining this texture are known, but they cannot be used because of major problems in the corrosion behavior of the reactor.

SUMMARY

The objective of the invention is to propose a process for producing a flat product, whether plate or sheet, made of a zirconium alloy comprising, especially as addition element, niobium but not 100% recrystallized, which is intended especially for the manufacture of reactor spacer grids of light-water nuclear power plants and which solves the problems associated with irradiation-induced growth of the metal, while still preserving sufficient corrosion resistance properties.

For this purpose, the subject of the invention is a process for producing a flat product made of a zirconium alloy having a Kearns factor FT of between 0.30 and 0.70, characterized in that:

an ingot of zirconium alloy with the following composition, in percentages by weight, is smelted:
Nb=0.5 to 3.5%
Sn=0 to 1.5%
Fe=0 to 0.5%
Cr+V=0 to 0.3%
S=0 to 100 ppm
O=0 to 2000 ppm
Si=0 to 150 ppm,
the balance being zirconium and impurities resulting from the smelting;

said ingot is formed;
said formed ingot undergoes one or more hot-rolling passes in order to obtain a flat product, the final of said hot-rolling passes being carried out between (810-20Nb %)° C. and 1100° C. and not being followed by any quenching operation from the $\alpha+\beta$ or $\beta$ phase;
optionally, said flat product undergoes an annealing operation at a temperature not exceeding 800° C.; and
the flat product undergoes one or more cold-rolling/annealing cycles, said annealing operations not taking place above 800° C.

In one exemplary embodiment, the Nb content of the alloy is from 0.5 to 1.5%.

The final hot-rolling pass is preferably carried out at a temperature within ±130° C. of the temperature at which the alloy undergoes the $\alpha+\beta \rightarrow \beta$ transition.

The final of said hot-rolling passes is preferably carried out between 820–20Nb % and 1100° C.

Said final hot-rolling pass is preferably carried out between 900 and 1030° C.

The invention also relates to a flat product made of a zirconium alloy having a Kearns factor FT of between 0.30 and 0.70, characterized in that it is obtained by the above process.

Finally, the invention relates to a spacer grid for retaining the fuel rods in a light-water nuclear power plant reactor, characterized in that it is obtained by the forming of a flat product of the above type.

As will have been understood, the invention consists in producing a flat product, which may be termed a plate or sheet product depending on its final thickness, exhibiting excellent dimensional stability under irradiation in the transverse direction (with respect to the rolling direction). This dimensional stability results from the formation, after production of the flat product, of a texture such that the Kearns factor FT in the transverse direction is equal to 0.30 or higher, and in practice between 0.30 and 0.70, as opposed to less than 0.25 in the current standard processes and 0.4 to 0.5 in the process of EP-A-0 220 060 which, moreover, requires a fully recrystallized state of the flat product, which is unnecessary in the case of the invention. In this way, if the plate is cut along a judiciously chosen direction in order to constitute, after forming, the reactor grid according to the invention, what is obtained is a grid exhibiting excellent dimensional stability under irradiation in the cross section of the rod retention cells. Thus, the problems associated with excessive relaxation in the retention of the cells and, on the contrary, problems associated with eventual excessive clamping of the rods in the cells are avoided.

This result is obtained by applying, to a Zr—Nb alloy (which may also contain one or more of the elements Sn, Fe, Cr, V, S, O and Si in significant amounts), heat and thermomechanical treatments that will be described later.

It will be recalled that the irradiation-induced growth of the grids is determined by three parameters:

the texture of the plate or sheet, which may be varied in order to obtain a Kearns factor going in the sense of expansion or contraction along a preferred axis (free growth); a Kearns factor of less than 0.33 in a given direction corresponds to free growth that gives rise to an expansion in this same direction and a Kearns factor of greater than 0.33 corresponds to free growth that gives rise to a contraction;
corrosion/oxidation which will always go in the sense of expansion; and
hydriding, which will also go in the sense of expansion.

The heat and thermomechanical treatments according to the invention, in combination with the composition of the alloy to which they are applied, make it possible to modify the Kearns factor FT in the transverse direction so that, taking into account the morphology and the future operating conditions of the grid (for example the temperature and linear power of the reactor of which the grid forms part), little or no irradiation-induced growth is observed.

In situations in which the corrosion/oxidation and/or hydriding are slight, it will be beneficial to obtain an FT close to 0.33.

In situations in which the corrosion/oxidation and hydriding are more important, it will be beneficial to obtain a higher FT (up to 0.70) so that the irradiation-induced growth resulting from these phenomena are compensated for by a free-growth contraction resulting from the texture obtained.

BRIEF DESCRIPTION OF THE DRAWINGS

The invention will be more clearly understood on reading the description that follows, given with reference to the following appended figures.

DETAILED DESCRIPTION

Figure 1:
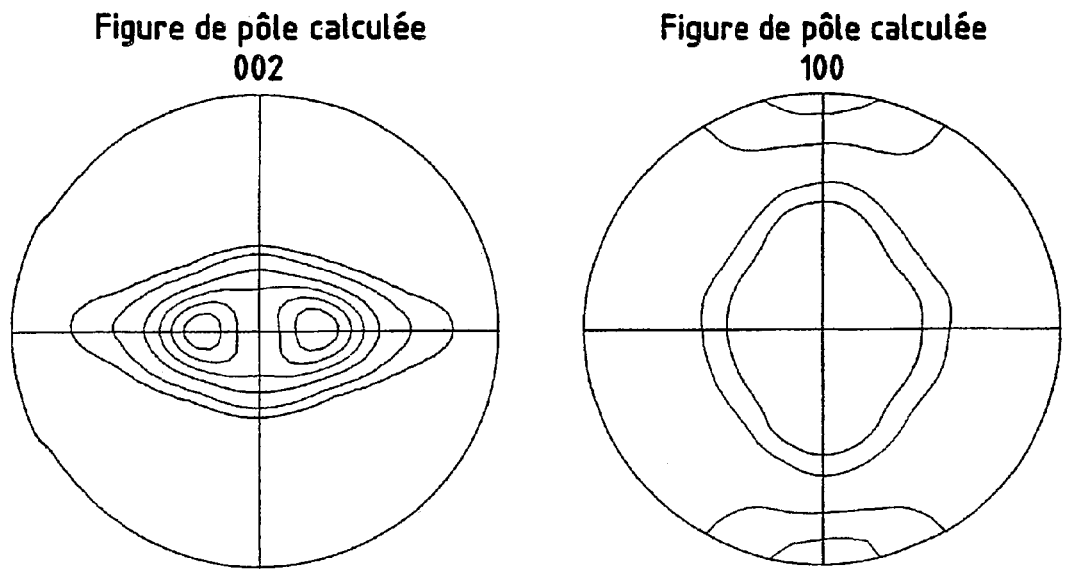
FIG. 1 shows by way of reference pole figures of a specimen of a flat product made of a Zr—Nb alloy containing about 1% Nb and having undergone a final hot-rolling pass at 780° C.

The zirconium alloys to which the invention applies contain (the percentages are percentages by weight):
0.5 to 3.5% and particularly 0.5 to 1.5% Nb;
preferably up to 1.5% Sn;
preferably up to 0.5% Fe;
preferably Cr and/or V, with Cr+V$\leq$0.3%;
optionally sulfur, up to 100 ppm;
optionally oxygen, up to 2000 ppm;
optionally silicon, up to 150 ppm; and
the inevitable impurities resulting from the smelting.

According to the invention, after smelting and forming of an ingot having the aforementioned composition, one or more hot-rolling passes are carried out. This hot rolling (the final pass thereof if there are several passes) must therefore take place while the zirconium alloy is in one of the $\alpha+\beta$ or $\beta$ domains and, more precisely according to the invention, between a minimum temperature, which depends on the Nb content of the alloy, and 1100° C. The minimum temperature (in °C.) for this final hot-rolling pass is equal to 810-20Nb %.

For an alloy containing 0.95% Nb, it is therefore 791° C. For an alloy containing 2.5% Nb, it is therefore 760° C. In practice, it is preferable to aim for a minimum hot-rolling temperature of 820–20Nb % (and therefore 10° C. higher than the theoretical minimum temperature defined above) for the purpose of providing a good operating margin. In particular, this thus ensures that the entire product to be rolled will be always at a suitable temperature during the rolling. Preferably, this temperature of the final hot-rolling pass lies within ±130° C. of the $\alpha+\beta \rightarrow \beta$ transition. The optimum temperature range is very often 900 to 1030° C. The reduction ratio for this final hot-rolling pass is typically between 50 and 95%.

It is imperative that this final hot-rolling pass in the $\alpha+\beta$ or $\beta$ domain is not followed by any quenching operation starting from this same domain. This is because $\beta$-Zr would then form when hot, which would lose the texture during the quench. This would therefore result in products having properties not according to the invention.

After this hot rolling and an optional anneal, the flat product obtained undergoes the usual cold-rolling and annealing operations, the annealing operations not taking place above 800° C.

It is not absolutely essential for the flat product obtained at the end of the treatment to be in the fully recrystallized state. The 0.30 to 0.70 FT condition, which guarantees low irradiation-induced growth in the transverse direction, may be satisfied even with a flat product in the relaxed or partially recrystallized state provided that the conditions of the invention are respected.

To exemplify this, a series of trials was carried out on an ingot of a zirconium alloy having the composition (in percentages by weight):

| | | |
|---|---|---|
| Nb = 0.95% | O = 1350 ppm | Fe = 0.037% |
| Cr = 40 ppm | S = 11–21 ppm | C = 22 ppm |
| N = 22 ppm | Al = 12 ppm. | |

Seven types of thermomechanical treatment were carried out on this 660 mm diameter ingot: four control trials (E1 to E4) and three trials according to the invention (E5 to E7), as indicated in Table 1.

Two other trials according to the invention (E8 and E9) were carried out on a 660 mm diameter ingot of the following composition:
Nb=2.50%
Fe=0.05%
O=1300 ppm
Si=50 ppm.
Table 1 describes these various treatments.

TABLE 1

| | E1 Control | E2 Control | E3 Control | E4 Control | E5 Invention | E6 Invention | E7 Invention | E8 Invention | E9 Invention |
|---|---|---|---|---|---|---|---|---|---|
| Forging of the ingot | | | 900° C. ($\alpha + \beta$), 200 mm thickness | | | | | 900° C. ($\beta$), 200 mm thickness | 1050° C. ($\beta$), 200 mm thickness |
| Forging of the slab | | | 900° C. ($\alpha + \beta$), 100 mm thickness | | | | | 900° C. ($\beta$), 100 mm thickness | 780° C. ($\alpha + \beta$), 100 mm thickness |
| Hot rolling | | | 945° C. ($\alpha + \beta$), 30 mm thickness | | | | | 945° C. ($\beta$), 30 mm thickness | 945° C. ($\beta$), 20 mm thickness |
| Intermediate quench $\beta$ | Yes | | | | No | | | | Yes |
| Hot rolling | 780° C., 4.7 mm thickness | 780° C., 4.7 mm thickness | 700° C., 4.7 mm thickness | 900° C., 4.7 mm thickness | 900° C., 4.7 mm thickness | 960° C., 4.7 mm thickness | 945° C., 4.7 mm thickness | 945° C., 4.7 mm thickness | 780° C., 6 mm thickness |

TABLE 1-continued

|  | E1 Control | E2 Control | E3 Control | E4 Control | E5 Invention | E6 Invention | E7 Invention | E8 Invention | E9 Invention |
|---|---|---|---|---|---|---|---|---|---|
| Continuous annealing No. of cold-rolling/annealing cycles | 0.425 mm thickness | | 0.6 mm thickness | | | 700° C. 0.425 mm thickness | | 2.0 mm thickness | 0.5 mm thickness |

The textures of the flat products obtained from these trials were determined. The Kearns factors FN, FT and FL obtained are given in Table 2.

TABLE 2

|  | Thickness (mm) | FN | FT | FL |
|---|---|---|---|---|
| Trial 1 (Control) | 0.425 | 0.687 | 0.230 | 0.082 |
| Trial 2 (Control) | 0.6 | 0.709 | 0.208 | 0.083 |
| Trial 3 (Control) | 0.6 | 0.649 | 0.270 | 0.082 |
| Trial 4 (Control) | 0.6 | 0.649 | 0.269 | 0.084 |
| Trial 5 (Invention) | 0.6 | 0.627 | 0.300 | 0.073 |
| Trial 6 (Invention) | 0.425 | 0.622 | 0.306 | 0.072 |
| Trial 7 (Invention) | 0.425 | 0.594 | 0.339 | 0.068 |
| Trial 8 (Invention) | 2.0 | 0.308 | 0.645 | 0.047 |
| Trial 9 (Invention) | 0.5 | 0.576 | 0.375 | 0.050 |

In the control trials, an increase in FN and a decrease in FT are obtained as usual when the thickness of the flat product decreases.

The specimens obtained by the process according to the invention have a Kearns factor FT that is significantly higher than the control specimens. If FT lies around the 0.33 value (hence the lower limit of 0.30 in the case of FT for the plate products according to the invention) and if a grid is manufactured from a portion of the flat product that has been cut along a suitable orientation, it is possible to ensure that, during its use, this grid will exhibit only small variations in the cross section of its cells in the absence of significant corrosion/oxidation and hydriding. If FT is significantly greater than 0.33, the tendency to undergo irradiation-induced contraction that results therefrom makes it possible to compensate for the irradiation-induced growth resulting from the corrosion/oxidation and hydriding of the grid during its use under planned conditions. Thus, both the problems that will be associated with excessive growth of this cross section under irradiation (relaxation of the clamping of the rods, weakening their retention) and the problems that will be associated with excessive reduction in this cross section under irradiation (excessively large clamping force on the rods, preventing them from being inserted and extracted) will be avoided.

Figure 2:
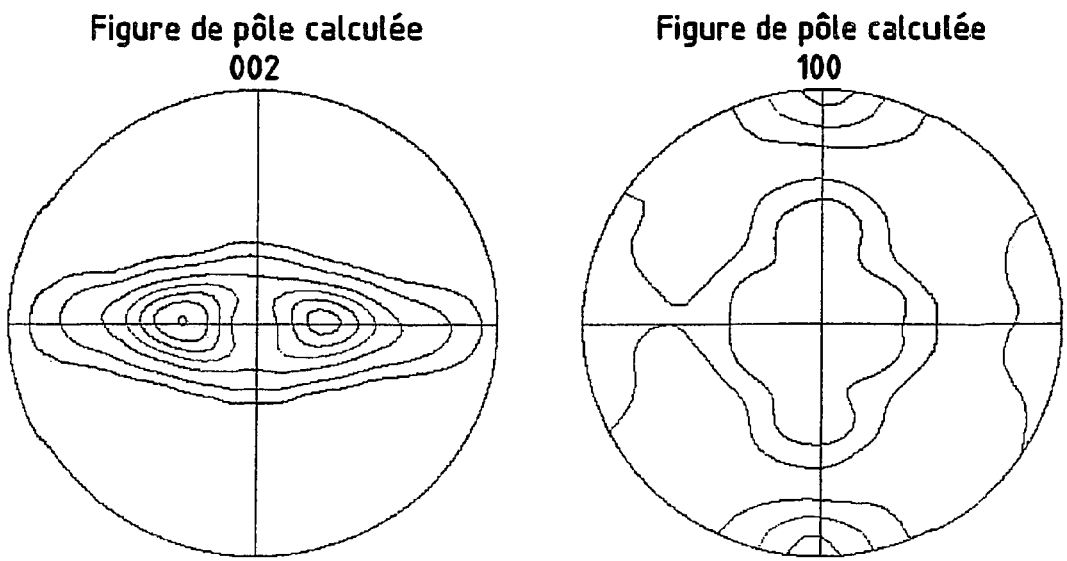
FIG. 2 shows pole figures of a specimen of a flat product made of a Zr—Nb alloy containing about 1% Nb and having undergone a final hot-rolling pass at 900° C. according to the invention.

Examination of the pole figures of a specimen example obtained by the process according to the invention corresponding to trial E5 (FIG. 2), for which the Nb content is around 1% and the final hot-rolling pass took place at 900° C., shows that the textures are clearly more transverse (high FT and low FN) than those of a control specimen of the same composition and final thickness corresponding to trial E2 (FIG. 1), for which the final hot-rolling pass was carried out only at 780° C.

It is also observed that the transverse character of the texture increases with the hot-rolling temperature, which is therefore one of the parameters, together with the composition of the alloy, which may be varied in order to obtain an FT of the desired value.

For a given hot-rolling temperature (for example 960° C.), this transverse character of the texture is even more accentuated when the $\alpha+\beta \rightarrow \beta$ transition temperature is lowered, for example for higher Nb contents, which may have the effect that the final hot-rolling pass takes place in the pure $\beta$ domain. This is the case for trial 8 described above, and to a lesser extent for trial 9 for which the final hot-rolling pass was carried out under less severe reduction conditions and at a temperature of 780° C., and therefore in the $\alpha+\beta$ domain of the alloy.

From the standpoint of the structure of the specimens, no clear difference may be seen between the control products and the products according to the invention after hot rolling, for comparable compositions and final thicknesses.

Nor, from the standpoint of the compositions of the $\beta$-Zr and $\beta$-Nb phases and of the $Zr(Nb,Fe)_2$ precipitates, is any appreciable difference observed between the control trials and the trials according to the invention by comparable alloy composition.

Nor is the corrosion resistance significantly affected by the use of the process according to the invention.

Spacer grids for retaining the rods of nuclear power plant reactors were manufactured from the flat products according to the invention by standard forming processes.

The invention claimed is:

1. A process for producing a flat product made of a zirconium alloy having a Kearns factor FT of between 0.30 and 0.70 consisting of:
    smelting a zirconium alloy having a composition, in percentages by weight, of
    Nb=0.5 to 3.5%
    Sn=0 to 1.5%
    Fe=0 to 0.5%
    Cr+V=0 to 0.3%
    S=0 to 100 ppm
    O=0 to 2000 ppm
    Si=0 to 150 ppm, a balance being zirconium and impurities resulting from the smelting;
    forming an ingot of the smelted zirconium alloy;
    performing on the ingot at least one hot rolling pass in order to obtain a flat product, a final of the hot-rolling passes being carried out between 900 and 1030° C. and not being followed by any quenching operation;
    annealing the flat product not exceeding a temperature of 800° C.; and
    performing at least one cold-rolling/annealing cycle on the flat product wherein the annealing cycle does not occur above 800° C. to produce a flat product having a Kearns factor FT of between 0.30 and 0.70.

2. The process according to claim 1, wherein the Nb content of the alloy is from 0.5 to 1.5%.

3. A process for producing a flat product made of a zirconium alloy having a Kearns factor FT of between 0.30 and 0.70 consisting of:
- smelting a zirconium alloy having a composition, in percentages by weight, of
  - Nb=0.5 to 3.5%
  - Sn=0 to 1.5%
  - Fe=0 to 0.5%
  - Cr+V=0 to 0.3%
  - S=0 to 100 ppm
  - O=0 to 2000 ppm
  - Si=0 to 150 ppm, a balance being zirconium and impurities resulting from the smelting;
- forming an ingot of the smelted zirconium alloy;
- performing on the ingot at least one hot rolling pass in order to obtain a flat product, a final of the hot-rolling passes being carried out between 900 and 1030° C. and not being followed by any quenching operation; and
- performing at least one cold-rolling/annealing cycle on the flat product wherein the annealing cycle does not occur above 800° C. to produce a flat product having a Kearns factor FT of between 0.30 and 0.70.

4. The process according to claim 3, wherein the Nb content of the alloy is from 0.5% to 1.5%.

* * * * *